United States Patent [19]

Whelan et al.

[11] 3,926,854
[45] Dec. 16, 1975

[54] OXIDATION CATALYST

[75] Inventors: James M. Whelan, La Canada, Calif.; Richard J. Brook, Didcot, England

[73] Assignee: University of Southern California, Los Angeles, Calif.

[22] Filed: Dec. 17, 1970

[21] Appl. No.: 99,239

[52] U.S. Cl. .............. 252/462; 252/463; 252/464; 252/465; 252/466 J; 423/213.2; 423/213.5
[51] Int. Cl.² ........................................ B01J 23/10
[58] Field of Search .......... 252/462, 463, 464, 465, 252/466 J

[56] References Cited
UNITED STATES PATENTS

| | | | |
|---|---|---|---|
| 1,207,706 | 2/1915 | Bosch | 252/462 X |
| 3,299,156 | 1/1967 | Dwayne | 260/673.5 |
| 3,316,057 | 4/1967 | Howk et al. | 423/213.2 |
| 3,322,491 | 5/1967 | Barrett | 23/2 |
| 3,322,692 | 5/1967 | Clark | 252/462 |
| 3,404,100 | 10/1968 | Taylor | 252/462 |
| 3,450,789 | 6/1969 | Kehl | 260/680 |
| 3,524,721 | 8/1970 | Stephens | 23/2 |
| 3,644,147 | 2/1972 | Young | 136/86 D |
| 3,780,126 | 12/1973 | Manning | 252/471 X |

OTHER PUBLICATIONS

Wells, Structural Inorganic Chemistry, Oxford Press, 1950 2nd Edition, pp. 375–378.
Van Santen et al., Physica, 16, pp. 599–600 (1950).
Jonker et al., Physica, 19, pp. 120–130 (1953).
Yakel. Acta. Cryst. 8, pp. 394–398 (1955).

*Primary Examiner*—W. J. Shine
*Attorney, Agent, or Firm*—Harris, Kern, Wallen & Tinsley

[57] ABSTRACT

A class of ceramic mixed oxide, nonstoichiometric electrically neutral rare-earth-type catalyst containing rare-earth-type elements and elements of the first transition metal series and optionally the alkaline earth metals. The catalyst has the following formula:

$$X_n J_{(1-n)} Z O_{(3 \pm m)} \quad (1)$$

wherein:
X is an alkaline earth metal or mixture thereof;
J is a rare-earth-type element or mixture thereof;
Z is a metal of the first transition series or a mixture thereof, at least 0.01% of said metal having an oxidation state other than +3;
m is a number having a value of between 0 and about 0.11; and
n is a number having a value from 0 to about 0.51.

These mixed oxide catalysts can be used to catalytically oxidize low molecular weight inorganic compounds and elements, such as ammonia, carbon monoxide, hydrogen, sulfur dioxide, and hydrogen sulfide, with oxygen, or carbon monoxide with water, sulfur dioxide or nitric oxide. The catalyst can also be employed in the catalytic removal of carbon monoxide, hydrocarbons and nitric oxides from the exhaust gases of generating or heating plants and automobiles burning fossil fuels.

9 Claims, No Drawings

OXIDATION CATALYST

This invention is directed to a class of oxidation catalysts, to catalytic oxidation processes utilizing such catalysts, and to methods of catalytically treating exhaust gases with such catalysts to produce exhaust gases substantially free of harmful pollutants.

More particularly, the present invention is directed to a class of ceramic mixed oxide nonstoichiometric electrically neutral oxidation catalysts of the following formula:

$$X_m J_{(1-m)} Z O_{(3-n)} \quad (1)$$

wherein: X is an alkaline earth metal or mixture thereof;

J is a rare-earth-type element or mixture thereof;

Z is a metal of the first transition series or a mixture thereof, at least 0.01% of said metal having an oxidation state other than +3;

m is a number having a value of between 0 and about 0.11; and n is a number having a value from 0 to about 0.51.

Further, the present invention is directed to processes for the catalytic oxidation of ammonia, carbon monoxide, hydrogen, hydrocarbons, sulfur dioxide and hydrogen sulfide with oxygen; of carbon monoxide with water vapor, sulfur dioxide or nitric oxide; and of a gaseous mixture of uncombusted or partially combusted fossil fuel, carbon monoxide, carbon dioxide and atmospheric gases with oxygen without the concomitant production and emission of nitric oxide in the exhaust gas, employing the catalyst described herein. Furthermore, the present invention is directed to methods of treating exhaust gases from chemical plants, electrical utility generating plants, heating plants, steel mills, smelting plants, trucks and automobiles to remove gaseous pollutants, such as carbon monoxide, hydrocarbons, partially oxidized hydrocarbons, the oxides of nitrogen, and nitric dioxide, therefrom.

Since the advent of modern technology, air pollution has become a serious and sometimes tragic problem for man. The present industrial plants and automobiles which burn the fossil fuels emit a staggering amount of gaseous pollutants, principally unburned or partially burned fossil fuels, carbon monoxide, the oxides of nitrogen, sulfur dioxide and ozone. These pollutants are chemically reactive and have been found to be harmful to both plant life and animal life. Under certain weather conditions, the accumulative emissions of these pollutants can have tragic effects; for example, in late 1930 about sixty people died and another 6,000 became seriously ill from breathing abnormally high levels of gaseous pollutants in the Muse Ruhr Valley of Belgium. A more recent calamity took place in the mill town of Donora, Pennsylvania, in 1948. The death smogs or fogs that hovered over London, England, in 1952 and 1962 are well documented. As stated above, gaseous pollutants not only affect animal life but they also affect plant life. Smog has been found to have a serious effect on the evergreen trees growing on the mountain sides surrounding the Los Angeles basin. Furthermore, the University of California Air Pollution Research Center has found that smog has a detrimental effect on the growth and the fruit yield of citrus trees.

Smog is a by-product of a complex series of photosynthetic reactions that occur in the atmosphere when certain molecular species are found therein. More particularly it has been found that the production of photochemical smog requires nitrogen oxides such as nitric oxide and nitrogen dioxide, hydrocarbons, and ultraviolet light. One of the possible routes for the production of smog is theorized as follows: During the combustion of a fossil fuel the oxides of nitrogen are formed. These nitrogen oxides and some unburned fuel together with carbon monoxide are emitted in the exhaust gases. In the presence of hydrocarbons and sunlight the nitric oxide is photochemically oxidized to nitrogen dioxide. The nitrogen dioxide mole is then photochemically split into nitric oxide and atomic oxygen. A portion of the atomic oxygen in turn interacts with molecular oxygen to form ozone or with hydrocarbons to form complex and reactive oxidation products. It then appears that a portion of the ozone reacts with the nitric oxide to provide a fresh supply of nitrogen dioxide. Another portion of the atomic oxygen and a portion of the reactive hydrocarbon oxidation products in the air form free radicals which in turn react very readily with oxygen, nitric oxide, nitrogen dioxide, and with other hydrocarbons to form more complex materials such as peroxyacyl nitrates. The peroxyacyl nitrates are suspected of being the principal cause of the eye-searing effect of smog; it has been documented that these compounds can cause substantial damage to crops when present in exceedingly small amounts, such as parts per hundred million.

From the time the primary gaseous pollutants known to cause photochemical smog were identified, it has been recognized that the elimination of these gaseous pollutants from the exhaust of industrial plants and vehicles would substantially eliminate photochemical smog. The chemical industry has been working diligently in this field over the last decade in an effort to accomplish this result. Some of the effort has resulted in the introduction of devices that give limited results, such as the smog-emission devices introduced on automobiles in the late 1960's. Other efforts have been directed toward catalysts and catalytic systems which can reduce the amount of hydrocarbons, carbon monoxide and nitric oxide emitted from the exhaust gas of motor vehicles and industrial plants burning fossil fuels. This effort has only been partially successful for a variety of reasons. For example, many of the catalysts developed were prepared from precious metals such as platinum and palladium; the resulting catalysts are expensive and are not economically feasible to use. Other catalysts have been developed which are readily deactivated by the presence of sulfur, oxygenated sulfur compounds or metals, such as lead. Other catalysts, that have been developed, are environmentally and/or chemically sensitive and are rapidly inactivated when operated at high temperatures or in the presence of certain materials. Many of the present catalysts are only effective at low space velocities and can only be utilized in a catalytic system having a large catalytic bed and catalytic chamber to provide sufficient contact time between the exhaust gases and the catalyst. The catalytic systems that have been developed are generally quite complex and require more than one catalyst with each catalyst operating within a particular temperature range. To our knowledge no catalytic system has been developed for the removal of gas pollutants from fossil fuel exhaust fumes utilizing one catalyst which can effectively operate over a broad temperature of the exhaust gases.

An object of the present invention is to provide an oxidation catalyst which exhibits excellent efficiencies over a broad temperature range and at high space velocities. More particularly, it is an object to provide an oxidation catalyst that exhibits excellent chemical and thermal stability.

Another object of the present invention is to provide an oxidation catalyst which is effective in selectively oxidizing a broad range of molecular species, such as ammonia, carbon monoxide, hydrocarbons, and the like. More particularly, it is an object to provide an oxidation catalyst that can be used in the treatment of exhaust gases from industrial plants and motorized vehicles utilizing fossil fuels for the removal of substantially all carbon monoxide, combusted and partially combusted hydrocarbons, oxygenated hydrocarbons and oxides of nitrogen therefrom.

Ceramic, stoichiometric compounds of the following empirical formula are known and have been used in high temperature electrodes:

$$X'_n Y'_{(1-n)} Z' O_3$$

wherein:
X' is strontium,
Y' is yttrium or lanthanum,
Z' is a metal of the first transition series, and
n is 0 or 0.22.

The catalytic activity of these compounds has apparently never been recognized and we believe we are the first to discover their catalytic properties. In an attempt to improve the catalytic activity of the above ceramic compounds we made the discovery that we could prepare ceramic, nonstoichiometric, electrically neutral compounds of the following formula and that in most cases these compounds exhibited superior catalytic activity because of their nonstoichiometric nature:

$$X_n J_{(1-n)} Z O_{(3-m)} \quad (I)$$

wherein:
X is an alkaline earth metal or mixture thereof;
J is a rare-earth-type element or mixture thereof;
Z is a metal of the first transition series or a mixture thereof, at least 0.01% of said metal having an oxidation state other than +3;
m is a number having a value of between 0 and about 0.11; and
n is a number having a value from 0 to about 0.51.

The catalyst of the present invention is a ceramic, mixed oxide, nonstoichiometric electrically neutral catalyst containing a rare-earth-type element or mixture thereof, a metal of the first transition series or mixtures thereof, oxygen atoms, and optionally an alkaline earth metal or mixture thereof. The transition metal or metals are present as mixed oxides wherein the metal is present in more than one oxidation state. The rare-earth-type element or elements can also be present in more than one oxidation state.

The alkaline earth metals include beryllium, magnesium, calcium, strontium, barium, and radium; in the present invention the preferred alkaline earth elements are magnesium, calcium, strontium, and barium. The rare-earth-type elements are scandium, yttrium and the rare earth elements, e.g., lanthanum, cerium, praseodymium, neodymium, promethium, samarium, europium, gadolinium, terbium, dysprosium, holmium, erbium, thulium, ytterbium, and lutetium. In the present invention the preferred rare-earth-type elements have atomic numbers between 20 and 72. The metals of the first transition series include titanium, vanadium, chromium, manganese, iron, cobalt, nickel, copper and zinc. In the present invention the preferred metals of the first transition series include those metals having an atomic number between 21 and 31. At least 0.01% of the transition metal atoms of the oxide catalyst have oxidation states other than +3; i.e., at least 0.01% of the transition metal atoms are present in oxidation states higher or lower than +3. In the preferred embodiment of the present invention, at least 0.1% of the transition metal atoms in a mixture of metal oxides have oxidation states other than +3. Although there is no upper limit to the percentage of metal atoms having oxidation states other than +3, rarely will more than 35% of the transition metal atoms have oxidation states deviating from +3. The rare-earth-type elements may be present in more than one oxidation state, i.e., between and including +2 to +4.

The ceramic, mixed oxide, nonstoichiometric, electrically neutral catalyst of the present invention is a solid crystalline compound at the temperatures at which it is used. Elements represented by X, J and Z of formula (I) are present in the catalyst as positively charged ions and the oxygen is present as negatively charged ions. The chemical bonding between X, J, Z and O is most accurately described as being ionic. As a solid chemical compound tha catalyst is partially characterized, we believe, by its crystal structure. It differs from the crystal structures of catalysts described as mixtures of oxides such as the hopcalites which are mixtures of metal oxides and not a homogenous mixed oxide compound.

Electrical neutrality in the mixed oxide catalysts of the present invention can be understood in terms of classical theory regarding ionic species and present theories regarding defect chemistry. Electrical neutrality in the present mixed oxide catalyst, in which fractions of the elements represented by Z and J are present as positive ions with charges other than +3, is maintained by a balance of negatively charged and positively charged ionic species and the presence of defects such as positively charged holes, interstitial positive ions, positive ion vacancies, negatively charged electrons and oxygen vacancies. An oxygen vacancy is an empty oxygen lattice site in a crystal structure normally occupied by $O^{-2}$ ions. The defects are particularly important in balancing the X and Z elements having charges other than +3. A fraction of the oxygen vacancy defects may exist as oxygen vacancy defect complexes in which the oxygen vacancy is localized preferentially about a particular positively charged ion. The catalyst exhibits high electronic conductivity at temperatures at which the defects, i.e., holes, vacancies, or electrons are mobile. Ionic conductivity within the catalyst is associated with the mobility of the oxygen ions and is enhanced by the presence of defects such as oxygen vacancies or oxygen vacancy complexes. It will be understood from the foregoing discussion that when m of the formula I is O, there is no readily measurable concentration of ionic defects in the compound and that where m is a value greater than O the compound is characterized by the presence of readily measurable ionic defects.

It appears that the surprising activity of the present catalyst arises from the nonstoichiometric character of the metal oxide composition contained therein. The present catalyst has a very high electronic conductivity and ionic conductivity. The sum of the electronic conductivity and the ionic conductivity is the electrical conductivity of material and is inversely proportional to the electrical resistance of the material. The present catalyst has an electrical conductivity of about 0.1 ohms $^{-1}$cm.$^{-1}$ to about 1000 ohms $^{-1}$cm.$^{-1}$. The ionic conductivity is a measurement of the ion flow or migration through and over a material. Most materials found in nature have very low ionic conductivities; however, molten salts and salts dissolved in water have very high ionic conductivities. The present catalyst has a high ionic conductivity and will readily permit ions to flow or migrate through and across its surfaces for the distances of 100 angstroms or more. The present ceramic, nonstoichiometric oxidation catalysts also have excellent selective adsorption properties. The present catalysts are relatively good adsorbers of partially oxidized or partially reduced molecular species such as carbon monoxide, sulfur dioxide, the oxides of nitrogen, and hydrogen sulfide, and they are relatively poor adsorbers of fully oxidized or reduced materials, such as carbon dioxide or nitrogen gas. The adsorption qualities of the present catalyst also appear to arise from its non-stoichiometric nature.

Without intending to limit the invention by the following discussion, it appears that many of the surprising characteristics of the present catalyst can be attributed to its high ionic and electronic conductivity, and selective adsorption characteristics. Under present theory, an effective catalyst must be a good adsorber of reactants and a relatively poor adsorber of the reaction products thereof. If the catalyst is a relatively poor adsorber of reactants, the space velocity of the gas stream containing the reactants and the relative gas pathway length throughout the catalyst are usually adjusted to give the reactants and catalytic surface the optimum contact conditions. The relatively high electronic conductivity of the present catalyst due to either mobile holes or electrons tends to enhance the effective areas of the catalyst by reducing the areas of the space charge regions around adsorbed molecules which tend to become polarized or ionic. Under present theory, it also appears that if the given reaction is a Red-Ox reaction, that is a reaction involving the oxidation of one reactant and the reduction of the other reactant, the site of reduction and the site of oxidation on the catalytic material must be relatively close, such as about 10 A or less, so that electrons and/or molecular ionic species resulting from the partial reduction or oxidation of the reactants can migrate between the two sites to complete the reaction. For example, when the catalyst is to be employed in the oxidation of carbon monoxide with water vapor to form carbon dioxide and hydrogen gas, the carbon monoxide molecule will become attached to an oxidation site and become chemically excited wherein it will readily accept either monoatomic oxygen or ionic oxygen to form carbon dioxide. A water molecule will become attached to a reduction site wherein the water molecule will be split apart to form diatomic hydrogen and monoatomic or ionic oxygen. The former will escape from the catalyst surface while the latter will migrate over the catalytic surface or through the catalyst as oxygen ions to a nearby carbon monoxide oxidation site to combine therewith and form carbon dioxide which will subsequently escape from the surface of the catalyst. If the oxidation and reduction sites are more than 10 A apart, the catalyst generally will not be very effective and will exhibit little catalytic activity. In the present catalyst, the respective reaction site can be separated by distances far exceeding 10 A; for example, the reaction sites can be separated by distances of 100 A or more, because the catalyst has high ionic and electronic conductivity which provides excellent mobility for electrons and atomic and molecular ionic species. Consequently, in the present catalyst electrons or holes can readily flow and migrate from site to site during a given chemical reaction and likewise oxygen ions can migrate and flow from site to site with relative ease.

The present catalysts are prepared by making up an aqueous solution of the corresponding water-soluble salts of the rare-earth-type elements, metals of the first transition series and alkaline earth metals, if the latter are to be included. Typical water-soluble salts that are employed include the nitrate and halide salts of the rare-earth-type elements, the metals of the first transition series and the alkaline earth metals. After the aqueous solution is thoroughly mixed, the solution is evaporated at either room temperature or at elevated temperatures to dryness and the resulting residue is calcined for several hours at elevated temperatures, such as temperatures between 900°C. and 1500°C. If the salts lack oxygen atoms, the salt mixture is calcined in the presence of oxygen gas. The resulting ceramic nonstoichiometric oxidation catalyst is a fine powder which can be readily milled, pressed and sintered to any desired shape. Alternatively, the powdered catalyst can be moistened, molded or extruded into a desired shape, and then sintered or fired. Alternatively, the present catalyst can be prepared from the water-insoluble salts, such as the sulfates, carbonates, or oxides of the rare-earth-type elements, the metals of the first transition series, and the alkaline earth metals. The salts are particulated and thoroughly mixed in their appropriate molar amounts. The resulting mixture of salts is then calcined as described above to prepare the ceramic oxidation catalyst of the present invention.

Referring to the above formula (I), the value of (3±m) is affected by the oxygen pressure during the calcining step. If the catalytic starting material is calcined in the absence of oxygen or at low oxygen partial pressures such as 10 mm Hg, the value of the quantity (3±m) will be smaller than if the starting catalytic material is calcined at high oxygen pressures such as 700 mm Hg, 3 atmospheres or the like.

As described above, the present catalyst of formula (I) and the ceramic, mixed oxide, stoichiometric, electrically neutral catalyst of the following formula $$X_n J_{(1-n)} Z O_3 \quad \text{(II)}$$

wherein X, J, Z, O and n are as defined above, can be employed in the oxidation of a wide variety of molecular species. For example, the above catalysts can be utilized in the following oxidation reactions:

A. $2CO + O_2 \longrightarrow 2CO_2$
B. $2H_2 + O_2 \longrightarrow 2H_2O$
C. Hydrocarbons and Oxygenated Hydrocarbons such as Aldehydes, Ketones, Ethers, Alcohols, and Carboxylic acids $+ nO_2 \longrightarrow_{mCO_2} + pH_2O$ wherein n, m and p are integers having a value of 1 or more.

D. $2SO_2 + O_2 \longrightarrow 2SO_3$
E. $2H_2S + 3O_2 \longrightarrow 2SO_2 + 2H_2O$
F. $4NH_3 + 4O_2 \longrightarrow 2N_2O + 6H_2O$
G. $4NH_3 + 5O_2 \longrightarrow 4NO + 6H_2O$
H. $2NO + O_2 \longrightarrow 2NO_2$
I. $2CO + 2NO \longrightarrow 2CO_2 + N_2$
J. $CO + H_2O \longrightarrow CO_2 + H_2$
K. $4CO + 2SO_2 \longrightarrow 4CO_2 + S_2$
L. $4H_2S + 2SO_2 \longrightarrow 3S_2 + 4H_2O$
M. Hydrocarbons $+ CO + CO_2 + H_2O + N_2 + O_2$ (slight excess) $\longrightarrow CO_2 + H_2O + N_2 + O_2$ (residue)

Reactions A–H and M normally will be carried out with atmospheric oxygen, i.e., with air. In such cases, in each of these oxidation reactions there will be little concomitant oxidation of the atmospheric nitrogen to the nitrogen oxides such as a nitric oxide. However, reactions A–H and M can be carried out with any oxygen containing gas. Reaction A can be conducted with only a trace of carbon monoxide and requires only a slight excess of the stoichiometric amount of oxygen needed for the complete combustion oxidation of the carbon monoxide to carbon dioxide. The reactants, i.e., the carbon monoxide and oxygen, are passed through a bed of the catalyst at a temperature between about 100°C. and about 1000°C. Reaction B can be conducted with only a trace amount of hydrogen and requires only a slight excess of a stoichiometric amount of oxygen needed for the oxidation of the hydrogen. In this reaction the reactants are passed through a bed of the catalyst at a temperature between about 100°C. and about 500°C. Reaction C can be practiced with hydrocarbons, such as methane, butane, benzene, or the like, aldehydes such as acetaldehyde or hexanal, ketones such as acetone or diacetone alcohol, alcohols such as methyl alcohol, propyl alcohol, or the like, carboxylic acids such as acetic acid, decanoic acid, or mixtures of the above. This reaction requires an excess of the stoichiometric amount of the oxygen needed for the complete combustion of the above-described reactants. The reactants and oxygen are passed over the catalyst at temperatures between about 100°C. and about 1000°C. At higher temperatures the reaction rate is appreciably increased and permits very high space velocities. Reaction D can be conducted with trace amounts of sulfur dioxide and requires an excess of the stoichiometric amount of oxygen needed for the oxidation of the sulfur dioxide. The reaction is conducted through a bed of the catalyst at a temperature between about 120°C. and about 800°C. Reaction E can be conducted with a trace amount of hydrogen sulfide and requires an excess of the stoichiometric amount of oxygen needed for the oxidation of the hydrogen sulfide. The reaction is conducted by bringing the reactants in contact with the catalyst at a temperature between about 100°C. and about 700°C. Reaction F can also be conducted with trace amounts of ammonia and requires an excess of the stoichiometric amount of oxygen needed for the oxidation of the ammonia. The reaction is carried out by bringing the reactants in contact with the catalyst of the present invention at a temperature between about 100°C. and about 400°C., preferably between about 250°C. and about 400°C. Reaction G is a very useful reaction and provides a method of making nitric oxide, the first stage in the manufacture of nitric acid. The reaction requires only a slight excess of the stoichiometric amount of oxygen needed to oxidize the ammonia to nitric oxide. The reaction is conducted at temperatures between about 100°C. and about 1000°C., preferably at a temperature of about 400°C. or higher. Reaction H represents the second stage in the manufacture of nitric acid from ammonia. The reaction is conducted at temperatures between about 100°C. and about 400°C. Reaction I is also a very useful reaction and it provides a route for the elimination of both carbon monoxide and nitric oxide from the exhaust gas of industrial plants and motorized vehicles utilizing fossil fuels. Both reactants can be present in trace amounts and can be present in equal stoichiometric amounts. The reaction is carried out in the presence of the catalyst at a temperature between about 200°C. and about 1000°C. When the reaction is conducted in the presence of oxygen or atmospheric oxygen, reactions A and H are favored and the principal by-products will be carbon dioxide and nitrogen dioxide. Reaction J is also a useful reaction and provides an alternative route for the elimination of carbon monoxide in exhaust gases produced by the combustion of fossil fuels. Both reactants can be present in trace amounts and either can be in excess. This reaction is also useful for commercial production of hydrogen. The reaction is conducted in contact with the catalyst at a temperature between about 150°C. and about 500°C. If this reaction is conducted in the presence of atmospheric oxygen, reaction A is favored and the principal reactants are carbon dioxide and water from the combustion of hydrogen and atmospheric oxygen. Reactions D and E provide a means of inexpensively producing sulfur trioxide for sulfuric acid production from sulfur dioxide and/or hydrogen sulfide. The reactions can be conducted with pure oxygen or with oxygen enriched air. Reaction F provides a means of inexpensively producing nitrous oxide. This reaction can be conducted with pure oxygen or with oxygen enriched air.

Reaction M is a reaction between atmospheric oxygen and an exhaust gas from industrial plants or motor vehicles burning fossil fuels with an oxygen deficiency. The exhaust gas will contain hydrocarbons and/or aldehydes, ketones, alcohols, carboxylic acids, and the like, carbon monoxide, carbon dioxide, water vapor, and atmospheric nitrogen. The reaction is conducted with a slight excess of atmospheric oxygen, that is a slight excess of the stoichiometric amount of oxygen needed for completely combusting the hydrocarbons or other like organic species and carbon monoxide to $CO_2$ and $H_2O$. The effluent gas will contain carbon dioxide, water vapor, atmospheric nitrogen and residual oxygen and will be substantially free of hydrocarbons, carbon monoxide, and oxides of nitrogen, particularly nitric oxide. The exhaust gases are put in contact with the catalyst of the present invention at a temperature between about 200°C. and about 700°C., preferably about 400°C.

Reactions K and L represent useful reactions for recovering $SO_2$ as elemental sulfur by catalytic oxidation of CO and $H_2S$ in the absence of excess air. Reaction temperatures must be sufficiently high so as to avoid the condensation of solid or liquid sulfur on the catalyst. The reaction temperatures are typically below 800°C.

As described above, the above catalysts of formulas I and II are very effective oxidation catalysts for the harmful gaseous pollutants found in the exhaust gases of industrial plants and motorized vehicles utilizing fossil fuels. Accordingly, the catalyst can be used to provide methods of eliminating these pollutants from exhaust gases. For example, one method of eliminating or substantially reducing the nitric oxide, carbon monoxide, and hydrocarbon pollutants from the exhaust gas of power plants, generating plants and steam plants utilizing fossil fuels such as natural gas, gasoline, oil stock and/or coal will comprise the following steps: burning the fossil fuel in an oxygen deficiency environment at a temperature between about 1600°C. and about 850°C. to produce an exhaust gas containing carbon dioxide, carbon monoxide, water vapor, unburned or partially burned fossil fuel and atmospheric nitrogen with the carbon dioxide and carbon monoxide being present in the ratio of about 100 to between about 1 and about 11. The combustion of the fossil fuel produces usable heat energy which in turn is employed to produce steam for steam turbines or expand the gases in a reciprocal engine or gas turbine. After the combustion gas has performed its energy function, its temperature will have dropped to between 300°C. and 700°C. The resulting cooled combustion gas will then be combined with a slight excess of atmospheric oxygen, i.e., at least a 1% excess of the stoichiometric amount of atmospheric oxygen needed to fully oxidize the remaining uncombusted or partially combusted fossil fuel and carbon monoxide in the combustion gas. The resulting air combustion gas mixture will then be passed through a bed of the catalyst at a temperature between about 300°C. and about 700°C. to fully oxidize the carbon monoxide and fossil fuel. The effluent gas will contain carbon dioxide, water vapor, atmospheric and residual oxygen. The effluent gas will be substantially free of all fossil fuels or remnants thereof, carbon monoxide and nitric oxide. When the first combustion step is conducted at 1200°C. and the subsequent catalytic treatment is conducted at 600°C. the resulting effluent gas will contain less than 1 ppm of fossil fuels or remnants thereof, less than 10 ppm of carbon monoxide and less than 10 ppm of nitric oxide. In sharp contrast the present industrial plants, such as steam-generating plants, which burn fossil fuel and use a single-step combustion process, wherein the fuel is burned in an excess of oxygen, produce an exhaust gas containing 500 ppm of fossilized fuel or remnants thereof, more than 250 ppm of carbon monoxide and more than 340 ppm of nitric oxide. These pollutants, as described above, are a major contributor to photochemical smog. The situation in motorized vehicles is even worse. Less than 10% of the motorized vehicles are properly adjusted and have their smog emission devices working at optimum conditions. The remainder of the vehicles are not properly tuned, have inoperative or poorly operating smog emission devices and/or faulty mufflers. The motorized vehicles emit vast quantities of unburned or partially combusted gasoline, massive amounts of nitric oxygen and appreciable amounts of carbon monoxide. The present invention contemplates a method utilizing the above catalysts for operating a motorized vehicle which will emit an exhaust gas which is substantially free of fossil fuels or remnants thereof, carbon monoxide and nitric oxide. Preferably the gasoline employed in the motorized vehicle would be lead free. However, gasolines containing less than 1 gram of lead per gallon could be utilized in the method described herein since the catalyts are relatively insensitive to lead contamination. The reciprocal engine will be adjusted to run on a rich mixture, that is, the engine will be run with an overall deficiency of oxygen. The engine can be adjusted so that it runs on an oxygen deficiency of between 10 and 0.1% so as to limit the formation of nitric oxide. The exhaust gases from the combustion chambers of the engine are vented or piped into a catalytic muffler containing the ceramic, mixed oxide catalyst of the present invention. The exhaust gases would contain unburned fuel or partially burned fuel, carbon dioxide, carbon monoxide, water vapor, and atmospheric nitrogen. Just before entering the catalytic muffler, the combustion gases could be combined with at least 1% of excess of atmospheric oxygen, that is, at least 1% in excess of the stoichiometric amount of oxygen needed for the complete combustion of the carbonaceous material in the combustion gas. The resulting mixture would then be passed through the catalytic muffler at a temperature between about 200° C. and about 700° C. The resulting effluent gas would contain carbon dioxide, water vapor, atmospheric nitrogen, and residual oxygen. The effluent gas would be substantially free of all fuel and remnants thereof, carbon monoxide, and nitric oxide. The above catalysts are ideally suited to the above-described method for two reasons: (1) the catalysts are relatively unaffected by metallic substances, such as lead, and (2) the present catalysts will selectively oxidize carbonaceous material, such as carbon monoxide and hydrocarbons, in preference to atmospheric nitrogen over a broad range of temperatures.

The present catalyst can also be used to produce a two-step catalytic process for removing gaseous pollutants from fossil fuel exhausts, that is, the exhaust gases produced by the combustion of fossil fuels. In this method, the fossil fuel can be burned with a stoichiometric amount of atmospheric oxygen or a slight deficiency. The fossil fuel can be burned at a temperature of 1000° C. or higher. At temperatures of 1400° C. the fossil fuel is burned with a deficiency of oxygen in order that at least as much carbon monoxide, on a molar basis, is produced as nitric oxide, preferably at least twice as much carbon monoxide is produced; nitric oxide production is disproportionately increased at high temperatures. The combustion gases will contain fossil fuel, partially combusted fossil fuel, carbon dioxide, carbon monoxide, water vapor, nitric oxide and atmospheric nitrogen. If fossil fuel contains sulfur or sulfur containing compounds, sulfur and hydrogen sulfide will also be found in the combustion gases. After the combustion gases have fulfilled their energy function, they will have cooled to about 700° C. or less. The cooled combustion gases are passed through a bed of the catalyst wherein the carbon monoxide is oxidized by nitric oxide and water to carbon dioxide. If the fuel contains sulfur containing compounds, the resulting effluent gas may be cooled to recover the sulfur. The resulting effluent gas is then mixed with a slight excess of atmospheric oxygen and passed through a second bed of catalyst of the present invention wherein the fossil fuel, partially combusted fossil fuel, remaining carbon monoxide, remaining nitric oxide, hydrogen sulfide, and sulfur are fully oxidized yielding an exhaust gas consisting essentially of carbon dioxide, water vapor, sulfur trioxide, atmospheric nitrogen, nitrogen dioxide and residual atmospheric oxygen. The exhaust gases will be essentially free of the gaseous pollutants, i.e., oxides of nitrogen and sulfur. This method is particularly applicable for use on motorized vehicles and high-temperature industrial plants wherein a large quantity of nitric oxide is produced during the combustion step.

As described above, the above compounds of formulas (I) and (II) can be formed and utilized in various states and shapes such as powdered form, pellets, flakes, and the like. For the industrial plant use or catalytic muffler use, the catalyst can be used as a powder, as pressed sintered pellets, macaroni-shaped tubes, flat or curved flakes, and the like. The catalyst also can be used on a support such as a ceramic refractory, glass or high-melting metal support substance. As mentioned above, the powdered catalyst can be pressed into shape and fired or sintered to fix the shape. Alternatively, the powder material can be made plastic by mixing with water or with an organic binder and extruded into any desired shape and sintered or fired into that shape. In another alternative method, the catalyst can be made into a liquid paint or ink which can be used to coat a support or walls, such as muffler walls, and the like. After the coating is complete, the catalytic paint or ink can be dried and fired to fix the coating to the underlying support or wall. If an extremely thin layer, such as $10^3$ A, of the catalyst on a particular support is required, the catalyst can be coated on the support by ionic sputtering.

The operating temperature ranges cited are particularly wide for the catalyst. This results from the low, high and overlapping temperatures over which specific examples of the catalyst of the present invention are characterized by high electronic and ionic conductivities which contribute to the electrical conductivity. This desired feature permits optimization with regard to chemical and thermal stability for a specific application.

The following examples are included to further illustrate the present invention and are not intended as limitations thereof.

EXAMPLE 1

An aqueous mixture of 6 moles of a lanthanum nitrate ($La(NO_3)_3$) and 6 moles of cobalt nitrate ($Co(NO_3)_2$) is prepared from the corresponding lanthanum and cobalt nitrate salts. The solution is boiled and evaporated to dryness; the resulting residue is calcined in air for 7 hours at 1200°C. to produce a fine powder having the following empirical formula:
$$LaCoO_3.$$
A substantially identical catalyst is prepared by employing the corresponding chloride salts in place of the nitrate salts in the above procedure.

The above powdered catalyst is moistened with distilled water to prepare a thick paste which is extruded into macaroni-shaped tubes. The tubes are air-dried for 48 hours and then fired at 1300°C. for 3 hours.

EXAMPLE 2

An aqueous solution containing 1 mole of barium chloride, 9 moles of yttrium chloride and 10 moles of titanium chloride was prepared by dissolving the corresponding chloride salts in 100 liters of water. The resulting aqueous solution was evaporated to dryness under a vacuum. The resulting residue was calcined for 10 hours at 1200°C. under an atmosphere of air to produce a fine powder having the following empirical formula:
$$Ba_{0.1}Y_{0.9}TiO_3.$$
The resulting powder was pressed into cylindrical pellets measuring 5 millimeters by 2.5 centimeters in a hydraulic press at 10,000 psi and sintered at 1300°C.

EXAMPLE 3

A catalyst is made by the procedure of Example 1 by calcining under an inert argon gas atmosphere to produce a fine ceramic powder having the following empirical formula:
$$LaCoO_{(3-m)}$$
wherein $m$ has a value between 0 and 0.11.

EXAMPLE 4

A catalyst is made by the procedure of Example 1 employing 6 moles of chromium nitrate in place of cobalt nitrate and calcining under a 100% oxygen gas atmosphere to produce a ceramic powder having the following empirical formula:
$$LaCrO_{(3+m)}$$
wherein $m$ has a value between 0 and 0.11.

EXAMPLE 5

An aqueous solution containing 3 moles of calcium bromide, 7 moles of a mixture of cerium nitrate, neodymium nitrate, and lanthanum nitrate, and 10 moles of nickel chloride are prepared by heating 75 liters of distilled water to boiling and adding the above corresponding salts of calcium, cerium, neodymium, lanthanum and nickel. The solution is boiled to dryness and the residue is calcined under a nitrogen gas atmosphere for 5 hours at 1150°C. to produce a crusty residue of the empirical formula:
$$Ca_{0.3}(CeNdLa)_{0.7}NiO_{(3-m)},$$
wherein $m$ is a value between 0 and 0.11, which powdered on scraping. The resulting powder is moistened with water to produce a thin paste. Neutral alumina pellets are rolled through the paste to coat the catalyst thereon. The coated pellets are air-dried and fired at 1250° C. for 3 hours to bond the catalyst coating to the pellets.

EXAMPLE 6

A 100 liter aqueous solution containing 0.1 mole of calcium chloride, 9.9 moles of a mixture of rare earth nitrates wherein the rare earth elements have atomic numbers from 57 to 71, and 10 moles of a 50:50 mixture of chromium and manganese nitrate. The resulting aqueous solution is boiled to dryness at 1 mm. of Hg vacuum and the resulting residue is calcined for 8 hours at 800° C. under an atmosphere of air at 2 atmospheres pressure. The resulting catalyst powder is pressed into spherical shapes measuring 5 millimeters in diameter and sintered at 1000° C.

EXAMPLE 7

To 10 liters of water, there are added 0.29 mole of strontium chloride, 0.70 mole of ytterbium chloride, 0.01 mole of lutetium chloride, and 1 mole of vanadium chloride. The resulting mixture is heated and stirred to form a solution which is filtered and evaporated to dryness at room temperature under vacuum to form a dry residue. The residue is calcined to 1050° C. for 8 hours under an atmosphere of air to produce a ceramic powder.

The powder is moistened and pressed into flat sheets 2.5 millimeters thick; the pressed sheets are dried and fired at 1200° C. for 9 hours to form ceramic sheets which are thereafter broken into 1 centimeter flakes.

EXAMPLE 8

A mixture of 283 g. of lanthanum sulfate, 50 g. of chromic anhydride, and 77.5 g. of cobalt sulfate is milled to a fine powder. The powder is moistened with a 70:3:30 mixture of water, glycerine and gum arabic to form a paint. The catalytic paint is coated on fired alumina plates and allowed to air-dry. The coated plates are then fired in air to 1100° C. for 36 hours to produce a ceramic catalytic plate.

EXAMPLE 9

An air stream containing 10 ppm carbon monoxide was heated to 200° C. and passed through a bed of a ceramic, mixed oxide nonstoichiometric, electrically neutral catalyst having the following empirical formula:

$$Sr_{0.1}La_{0.9}CoO_{3\pm m}$$

wherein $m$ has a value of from 0 to about 0.11 The catalyst bed measured 1 centimeter in diameter and 10 centimeters in length and the velocity of the gas was 10 centimeters per second. The effluent gas was cooled to room temperature and analyzed with gas liquid chromatography using a thermal conductivity detection cell and a 30 foot column containing molecular sieve which showed that the resulting air stream had less than 5 parts ppm. of carbon monoxide and no nitric oxide. Substantially similar results will be obtained by employing the other catalysts described above in the temperature ranges where they are characterized by having significant electrical conductivities.

Substantially the same results are obtained by employing a ceramic, mixed oxide, nonstoichiometric, electrically neutral catalyst of the following formula:

$$SrLa_9(CrO_{3\pm m})_{10}$$

wherein $m$ has a value of from 0 to about 0.11 and heating the air stream to 400°C.

EXAMPLE 10

An air stream containing 5% carbon monoxide and 10% water is passed through a bed of sintered pellets of a ceramic catalyst of the present invention having the following empirical formula:

$$CaLa_9(NiO_3\pm_m)_{10}$$

wherein m has a value between 0 and 0.11. The catalyst bed measures 1 centimeter by 15 centimeters and is heated to about 350°C. The velocity for the gas stream is 12 centimeters per second. The effluent gas contains less than 10 parts per million (ppm.) carbon monoxide and virtually no nitric oxide.

EXAMPLE 11

An air stream containing 15% sulfur dioxide is passed through a bed of ceramic flakes of a ceramic nonstoichiometric catalyst having the following empirical formula:

$$YFeO_{3\pm m}$$

wherein $m$ has a value of from 0 to about .11. The catalyst is prepared according to the procedure of Example 7. The catalytic bed measures 1 centimeter in diameter and 12 centimeters in length and is heated to 250°C. The effluent gas contains sulfur trioxide and is substantially free of sulfur dioxide, and nitric oxide.

Substantially identical results are obtained when the catalyst is maintained at a temperature between 300°C. and 450°C.

EXAMPLE 12

An air stream containing 4% hydrogen sulfide is passed through a bed of a powdered ceramic nonstoichiometric catalyst of the following empirical formula:

$$Sr_{.2}Ce_{.x}CoO_3\pm_m$$

wherein $m$ has a value of from 0 to about .11. The catalyst can be prepared according to the procedure of Examples 1, 3, or 4. The gas stream is heated to 400°C. and the velocity of 20 centimeters per second is maintained through the catalytic chamber which measures .8 centimeters in diameter by 12.5 centimeters in length. The effluent gas contains sulfur trioxide and water and is substantially free of hydrogen disulfide and nitric oxide.

EXAMPLE 13

An air stream containing 5% ammonia is heated to 1000°C. and passed through a bed of a powdered, ceramic, nonstoichiometric catalyst of the following empirical formula:

$$Y_2La_2Ce_2Nd_2Sm_2NiO_{3-m}$$

wherein m has a value between 0 and 0.11. The catalyst chamber measures 10 centimeters in diameter by 1 meter and the velocity of the gas stream is maintained at 7.5 liters per second. The effluent gas stream is essentially free of ammonia and contains nitric oxide and water as the major by-products.

An air stream containing 10% nitric oxide and heated to 225°C. was utilized in place of the air stream containing ammonia in the above method to yield an effluent gas stream containing less than 0.2% nitric oxide; the major product is nitrogen dioxide.

EXAMPLE 14

A gas stream containing equal portions of carbon monoxide and nitric oxide is passed through a catalytic chamber containing a bed of sintered ceramic nonstoichiometric catalytic pellets of the following empirical formula:

$$Mg_3Ho_7TiO_{3-m}$$

wherein $m$ has a value of from 0 to about 0.11. The gas stream is maintained at 650°C. and passed through the catalytic chamber at a sufficient space velocity to insure that the reactants are in the catalytic chamber for approximately 1/10 of one second. The effluent gas is substantially free of carbon monoxide and nitric oxide and consists essentially of carbon dioxide and nitrogen gas.

The above carbon monoxide nitric oxide gas stream is replaced with an air stream containing 1% carbon monoxide, 1% nitric oxide, and 2% water. The effluent gas stream is substantially free of carbon monoxide, contains less than 10 parts per million nitric oxide and consists essentially of atmospheric gases and carbon dioxide.

EXAMPLE 15

The burners of a steam turbine generating plant boiler are operated with natural gas fuel so that the maximum flame temperature is 1500° C. The natural gas is burned in an oxygen deficiency to yield a combustion gas containing carbon monoxide, atmospheric nitrogen, water vapor, and carbon dioxide. The combustion gas also contains some nitric oxide and hydrocarbons. The ratio of $CO_2$ to CO in the gas is adjusted to a ratio of 95:5 by controlling the air supply. The combustion gas, after being employed in producing high-pressure steam, is combined with a 1% excess of atmospheric oxygen at a temperature of about 600° C. and passed through a catalytic chamber containing the catalyst of Example 1 at a space velocity sufficient to insure that the combustion gas is in contact with the catalyst for about 0.10 second to yield a stack gas which is substantially free of nitric oxide and carbon monoxide and contains principally carbon dioxide, water and atmospheric nitrogen. When the fuel is burned with a greater oxygen deficiency to yield a $CO_2$ to CO ratio of 90 to 10, an even cleaner stack gas with respect to nitric oxide is obtained.

With increasing temperatures for the initial combustion stage, increasing portions of nitric oxide will be emitted in the combustion gases. The following table shows the parts per million of nitrix nitric present in the combustion gas at various combustion temperatures for the first stage of combustion.

TABLE

| Combustion Temperature | Parts per million of nitric oxide in combustion gas |
|---|---|
| 1500° C. | 150 ppm |
| 1400° C. | 32 ppm |
| 1300° C. | 0.9 ppm |
| 1200° C. | 0.09 ppm |

The above method provides a method for public utilities to produce power with fossil fuels and yet emit a stack gas containing a minimal amount of nitric oxide, carbon monoxide, and unburned fuel. At present, most public utility plants producing energy from fossil fuel emit an exhaust gas containing from about 200 to about 1500 ppm of nitric oxide. In many areas of the country, such as Los Angeles, public utilities are a major contributor, up to 10%, of the nitric oxide in the air.

The above method can be employed utilizing natural gas, oil fuel, or coal with substantially the same results.

EXAMPLE 16

A carburetor and the timing of a reciprocal engine, which burns a gasoline containing 0.5 gm of lead/gallon, is adjusted so that the engine, when operating in its normal operating temperature, burns a slightly rich fuelair mixture having about a 1% oxygen deficiency. The exhaust or combustion gas from the cylinders of the reciprocal engine are vented through manifolds and exhaust pipes into a mixing chamber wherein the combustion gases are mixed with a slight excess of atmospheric oxygen, that is a 1% excess of the stoichiometric amount of oxygen needed to fully burn the carbonaceous material, i.e., unburned and partially burned gasoline and carbon monoxide, present in the combustion gases. The resulting mixture is then vented into a catalytic muffler containing an alumina honeycomb matrix coated with a catalyst having the following empirical formula:

$$Sr_{.1}La_{.9}CoO_3 \pm_m$$

wherein m has a value of from 0 to about 0.11. The catalytic chamber is designed such that the exhaust gas will travel through the muffler in about 0.1 second when the engine is working at its maximum revolution rate. The combustion gas has a temperature of above 300° C. when it comes in contact with the catalyst. The resulting effluent gas will contain less than $10^2$ parts per million of nitric oxide, less than 250 parts per million of carbon monoxide, and will be substantially free of gasoline or partially burned gasoline.

EXAMPLE 17

The combustion gases from a steam turbine generating plant burning fossil fuels in a 2.1% oxygen deficiency contains carbon dioxide, carbon monoxide, sulfur, hydrogen sulfide, nitric oxide, atmospheric nitrogen, water vapor, and unburned or partially burned fossil fuel. The combustion gas, which is heated to about 700°C., is passed through a catalytic chamber containing the catalyst of Example 6 at such a rate such that the catalyst and all the combustion gas come into contact. The gaseous pollutants in the resulting effluent gas are substantially reduced. In particular, the amount of carbon monoxide and nitric oxide contained therein are substantially reduced because the nitric oxide and water vapor have oxidized the carbon monoxide to carbon dioxide. The resulting effluent gas which has now cooled down to about 100° C. and the sulfur are collected by electrostatic precipitation. The resulting gas is heated to approximately 250° C. and combined with a 0.7% excess of the stoichiometric amount of oxygen needed to fully oxidize the unburned fuel, partially burned fuel, the sulfur-containing compounds and the remaining carbon monoxide. The resulting air and effluent gas mixture is passed through a second catalytic chamber containing the catalyst of Example 17. The second catalytic chamber is designed such that the gaseous mixture and the catalysts are in contact for approximately 0.1 to 0.5 seconds. The resulting effluent gas consists essentially of carbon dioxide, water vapor, atmospheric nitrogen and residual oxygen. The effluent gas contains less than 10 parts per million of nitric oxide, less than 5 parts per million of carbon monoxide, and is substantially free of nitrogen dioxide and unburned or partially burned fuel.

EXAMPLE 18

An air stream containing 3% carbon monoxide is passed through a bed of ceramic catalyst pellets of the following empirical formula:

$$Sr_{.1}La_{.9}CoO_3 \pm_m$$

wherein m has a value of from 0 to about 0.11. The catalyst is prepared in accordance with the method described in Example 6. The catalyst chamber measured 1 centimeter in diameter by 10 centimeters in length. The gas stream is maintained at a velocity of 10 centimeters per second. The process is repeated at different catalytic temperatures and the effluent for each reaction temperature is chemically analyzed to determine the conversion ratio of carbon monoxide to carbon dioxide. The results are shown in the following table.

TABLE

| Gas Stream Temperature (Reaction Temperature) | Percentage Conversion of CO to $CO_2$ |
|---|---|
| 160° C. | 20% |
| 200° C. | 80% |
| 300° C. | 100% (substantially) |

Examples 2, 5, 6, 7, 9, 10, 12, 14, 16 and 18 disclose representative catalysts of the formula I in which n has a value other than 0 and less than 0.51.

We claim:

1. A ceramic, nonstoichiometric, electrically neutral oxidation catalyst for treating exhaust gases from the combustion of fossil fuels, comprising a homogeneous mixed oxide compound having a unitary crystal structure and having the following empirical formula:

$$X_n J_{(1-n)} Z O_{(3)} \pm_{(m)}$$

wherein:
X is an alkaline earth metal or mixture thereof;
J is scandium, yttrium, a rare earth element, or mixture thereof;
Z is titanium, vanadium, chromium, iron, cobalt, nickel, or a mixture thereof, at least 0.01% of Z having an oxidation state other than +3;
m is a number having a value between 0 and about 0.11, with the understanding that when m is 0 there is no readily measurable concentration of ionic defects in the compound and that when $m$ is a value greater than 0 the compound is characterized by the presence of readily measurable ionic defects; and $n$ is a number other than 0 having a value up to about 0.51.

2. A ceramic, nonstoichiometric, electrically neutral oxidation catalyst for treating exhaust gases from the combination of fossil fuels, comprising a homogeneous mixed oxide compound having a unitary crystal structure and having the following empirical formula:

$$X_n J_{(1-n)} Z O_{(3 \pm m)}$$

wherein:
  X is an alkaline earth metal or mixture thereof;
  J is scandium, yttrium, a rare earth element, or mixture thereof;
  Z is titanium, vanadium, chromium, iron, cobalt, nickel, or a mixture thereof, at least 0.01% of Z having an oxidation state other than +3;
  $m$ is a number having a value between 0 and about 0.11, with the understanding that when $m$ is 0 there is no readily measurable concentration of ionic defects in the compound and that when $m$ is a value greater than 0 the compound is characterized by the presence of readily measurable ionic defects; and
  $n$ is a number having a value from 0 to about 0.51; said catalyst having an electrical conductivity of about 0.1 to 1,000 ohms $^{-1}$cm$^{-1}$ at temperatures of from about 200°C. to about 700°C.

3. The ceramic, nonstoichiometric, electrically neutral catalyst as defined in claim 1 wherein:
  X is magnesium, calcium, strontium, barium, or a mixture thereof.

4. The ceramic, nonstoichiometric, electrically neutral catalyst as defined in claim 1 wherein:
  X is strontium;
  J is lanthanum;
  Z is cobalt; and
  $n$ has a value of about 0.1.

5. The ceramic, nonstoichiometric, electrically neutral catalyst as defined in claim 1 wherein:
  X is calcium;
  Z is nickel; and
  $n$ is 0.3.

6. The ceramic, nonstoichiometric, electrically neutral catalyst as defined in claim 1 wherein:
  X is a mixture of magnesium and barium;
  Z is iron; and
  $n$ is 0.17.

7. The ceramic, nonstoichiometric, electrically neutral catalyst as defined in claim 1 wherein:
  X is strontium;
  Z is cobalt; and
  $n$ is 0.1.

8. The ceramic, nonstoichiometric, electrically neutral catalyst as defined in claim 1 wherein:
  X is strontium;
  J is cerium;
  Z is cobalt; and
  $n$ is 0.2.

9. The ceramic, nonstoichiometric, electrically neutral catalyst as defined in claim 2 wherein:
  J is lanthanum;
  Z is cobalt; and
  $n$ has a value of 0.

* * * * *

UNITED STATES PATENT OFFICE
CERTIFICATE OF CORRECTION

Patent No. 3,926,854            Dated December 16, 1975

Inventor(s) James M. Whelan and Richard J. Brook

It is certified that error appears in the above-identified patent and that said Letters Patent are hereby corrected as shown below:

References Cited:

3,299,156, "Dwayne" should be --Ashley--
(Cited incorrectly in Action of May 1, 1972)

Column 1, line 13, in the formula "(1n)" and "(3m)" should be --(1-n)-- and --(3 $\pm$ m)--

Column 3, line 36, in the formula "(3m)" should be --(3 $\pm$ m)--

Column 4, line 25, "tha" should be --the--

Column 6, line 67, "L. $4H_2S + 2SO_2 \quad 3S_2 + 4H_2O$" should be --L. $4H_2S + 2SO_2 \longrightarrow 3S_2 + 4H_2O$--

Column 12, line 67, "to 1100°C." should be --at 1100°C.--

Column 13, line 33, in the Example 10 (formula) "$CaLa_9(NiO_{(3\pm m)})_{10}$" should be --$CaLa_9(NiO_{(3\pm m)})_{10}$--

UNITED STATES PATENT OFFICE

CERTIFICATE OF CORRECTION

Patent No. 3,926,854            Dated December 16, 1975

Inventor(s) James M. Whelan and Richard J. Brook

It is certified that error appears in the above-identified patent and that said Letters Patent are hereby corrected as shown below:

Column 14, line 9, in the Example 13 (formula) "$Y_2La_2Ce_2Nd_2Sm_2NiO_{3-m}$" should be --$\underset{.}{Y}_2\underset{.}{La}_2\underset{.}{Ce}_2\underset{.}{Nd}_2\underset{.}{Sm}_2NiO_{3-m}$--

Column 14, line 28, in the Example 14 (formula) "$Mg_3Ho_7TiO_{3-m}$" should be --$\underset{.}{Mg}_3\underset{.}{Ho}_7TiO_{3-m}$--

Column 15, line 4, "nitric nitric" should be --nitric oxide--

Column 15, line 34, "fuelair" should be --fuel-air--

Signed and Sealed this

Seventh Day of September 1976

[SEAL]

Attest:

RUTH C. MASON
*Attesting Officer*

C. MARSHALL DANN
*Commissioner of Patents and Trademarks*